(12) United States Patent
Donoho

(10) Patent No.: US 8,286,385 B2
(45) Date of Patent: *Oct. 16, 2012

(54) ELECTRIFIED BIRD REPELLENT TRACK

(75) Inventor: Bruce Donoho, Mission Viejo, CA (US)

(73) Assignee: Bird-B-Gone, Inc., Mission Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,773

(22) Filed: May 16, 2012

(65) Prior Publication Data

US 2012/0224294 A1  Sep. 6, 2012

Related U.S. Application Data

(60) Division of application No. 13/224,183, filed on Sep. 1, 2011, now Pat. No. 8,196,341, which is a division of application No. 13/043,204, filed on Mar. 8, 2011, now Pat. No. 8,015,747, which is a continuation-in-part of application No. 12/959,834, filed on Dec. 3, 2010, now Pat. No. 8,020,340, which is a division of application No. 12/890,328, filed on Sep. 24, 2010, now Pat. No. 7,937,885, which is a division of application No. 11/376,270, filed on Mar. 14, 2006, now Pat. No. 7,802,396, said application No. 13/043,204 is a continuation-in-part of application No. 12/689,406, filed on Jan. 19, 2010, now Pat. No. 8,196,340.

(60) Provisional application No. 61/145,715, filed on Jan. 19, 2009.

(51) Int. Cl.
*A01M 19/00* (2006.01)
(52) U.S. Cl. .......................................... 43/98; 340/573.2
(58) Field of Classification Search .............. 43/98, 112; 340/573.2; 256/10; 361/232; 119/537
See application file for complete search history.

(56) References Cited

U.S. PATENT DOCUMENTS

| | | |
|---|---|---|
| 5,850,808 A | 12/1998 | Burdick |
| 6,006,698 A | 12/1999 | Negre |
| 7,249,436 B2 | 7/2007 | Ravenelle et al. |
| 7,351,913 B2 | 4/2008 | Waldorf et al. |
| 7,481,021 B2 | 1/2009 | Riddell |
| 2005/0132635 A1 | 6/2005 | Riddell |
| 2006/0032111 A1 | 2/2006 | Willard et al. |
| 2007/0214710 A1 | 9/2007 | Donoho |
| 2010/0180490 A1 | 7/2010 | Donoho |

FOREIGN PATENT DOCUMENTS

WO  95/08915  4/1995

*Primary Examiner* — Christopher P Ellis
(74) *Attorney, Agent, or Firm* — Fish & Associates, PC

(57) ABSTRACT

An animal deterring device has a carrier with a first conductive trace that is separated from a second conductive trace. The carrier has a bottom with a first glue trough disposed beneath the first conductive trace. The first conductive trace is coupled to the carrier by a first fastener that extends from the first glue trough to the first conductive trace.

14 Claims, 4 Drawing Sheets

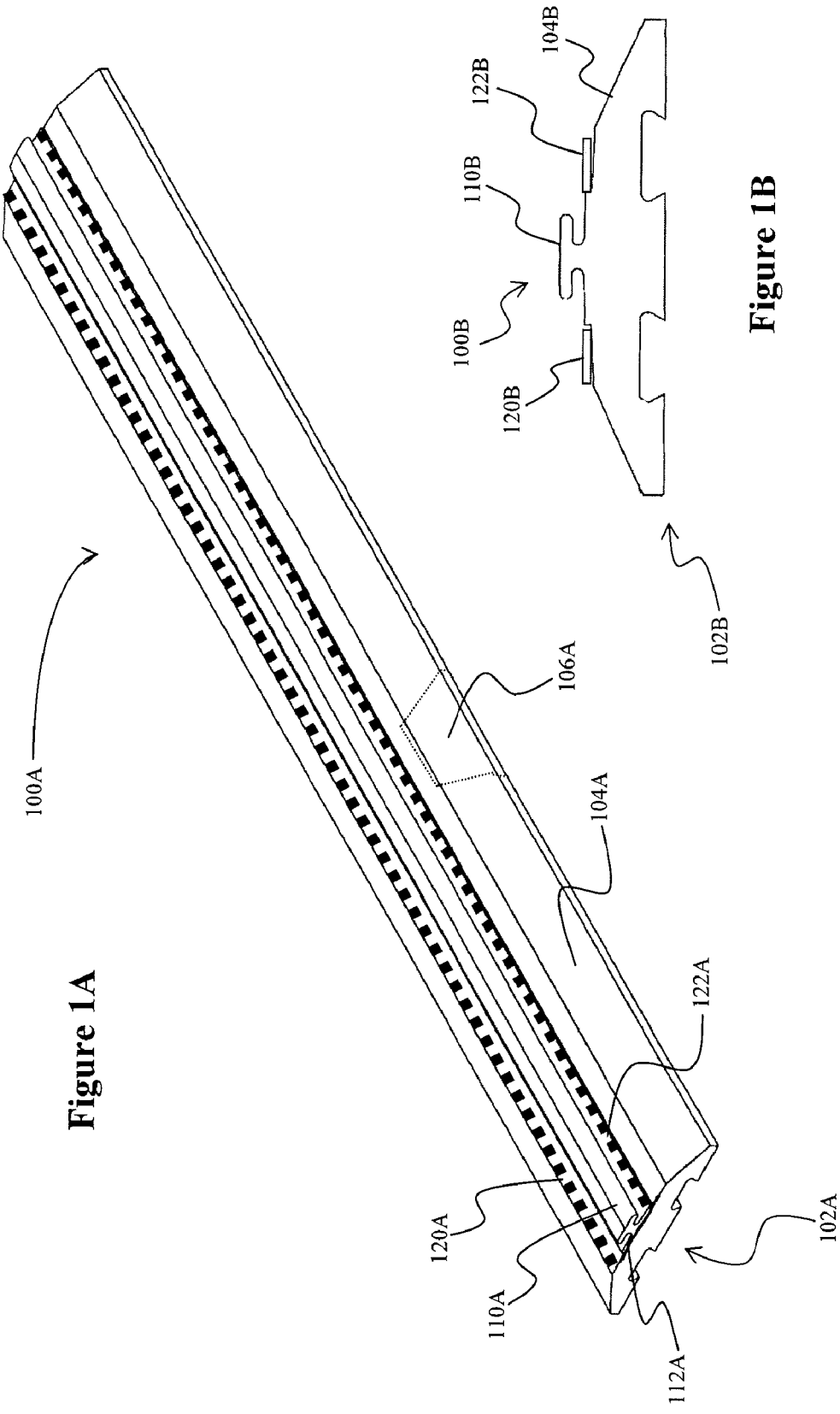

ELECTRIFIED BIRD REPELLENT TRACK

This application is a divisional application of U.S. patent application Ser. No. 13/224,183 filed on Sep. 1, 2011, which is a divisional application of U.S. patent application Ser. No. 13/043,204 filed on Mar. 8, 2011, now issued U.S. Pat. No. 8,015,747, which is a continuation-in-part application of U.S. patent application Ser. No. 12/959,834 filed on Dec. 3, 2010, now issued U.S. Pat. No. 8,020,340, which is a divisional of U.S. patent application Ser. No. 12/890,328 filed on Sep. 24, 2010, now issued U.S. Pat. No. 7,937,885, which is a divisional of U.S. patent application Ser. No. 11/376,270 filed on Mar. 14, 2006, now issued U.S. Pat. No. 7,802,396. U.S. patent application Ser. No. 13/043,204 is also a continuation-in-part application of U.S. patent application Ser. No. 12/689,406 filed on Jan. 19, 2010, which claims priority to U.S. provisional patent application No. 61/145,715 filed on Jan. 19, 2009. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is animal deterrents, and especially as they relate to bird deterrents.

BACKGROUND OF THE INVENTION

There are numerous animal deterring devices known in the art, and many of those use electric current to deter, and in some case even kill birds and other relatively small animals. For example, where a relatively large structure is to be protected, a blanket can be configured to include a plurality of vertically arranged and spaced apart electrodes as described in U.S. Pat. No. 6,925,748. While such devices may protect a relatively large area, numerous disadvantages remain. Among other things, pooling of water must be avoided at all times to allow for continuous operation. Moreover, as such devices are typically flexible, inadvertent short circuiting may occur by folding or bending a portion of the blanket.

Other known electrified devices include those described in U.S. Pat. No. 4,015,176 and EP 1 314 355 in which a string-shaped carrier includes conductive traces embedded or attached to the carrier. Similarly, string-shaped structures may be formed from braided wire that further includes insulator disks as described in U.S. Pat. No. 5,031,353. While such devices are generally simple to manufacture and operate, various difficulties remain. Among other problems, such devices often fail to operate properly when moisture or rain runs along the wire, or where droppings are deposited on the wire. Similar disadvantages are observed in devices that have a rail with partially embedded conductive traces from which raised conductive tabs protrude as shown in U.S. Pat. No. 6,006,698, or in devices having a rail with two elevated conductive traces as described in U.S. Pat. App. No. 20050132635. Such devices are particularly sensitive to puddling or fecal contamination.

In still further known electrified deterring devices, conductive traces are mounted to an elevated carrier portion that includes spaces to allow for drainage and flexible installation as shown in U.S. Pat. No. 6,283,064 and U.S. Pat. No. 6,928,768. While such devices are often more reliable than known devices when exposed to moisture or droppings, other disadvantages arise. For example, due to the raised position of the wires, installation is frequently esthetically less pleasing than relatively flat rail-type structures. Moreover, positioning of the wires is at a fixed distance and in a manner that will allow at least some birds to perch in a position in which the bird will not receive the electrical impulse or current.

Therefore, while there are numerous devices and methods for deterring animals, and especially birds are known in the art, all or almost all of them suffer from various disadvantages. Thus, there is still a need for new configurations and methods for bird deterrents.

SUMMARY OF THE INVENTION

The present invention is directed to configurations and methods for animal deterring devices in which at least two electrically conductive traces are mounted on a carrier and in which the two traces are separated by an arc suppressor.

In one aspect of the inventive subject matter, an animal deterring device comprises a stripe-shaped carrier having a first conductive trace that is separated from a second conductive trace by an umbrelloid arc suppressor, wherein the carrier has a cutout that is configured to allow bending of the device and wherein the device has a height to width ratio between 1:5 and 1:2. It is generally preferred that the carrier in such devices is fabricated from a flexible material, and/or that the carrier has one or more cutouts that are configured to allow bending of the device (e.g., to accommodate horizontal and/or vertical curvature). As above, exemplary umbrelloid arc suppressors may have a T-shape, a stemmed inverted U-shape, or a stemmed inverted V-shape.

Moreover, it is generally preferred that the arc suppressor is continuous along the length of the carrier, and that at least one of the first and second conductive traces are continuous along the length of the carrier. Where desired, at least part of the carrier and/or at least part of the arc suppressor is angled, wherein the angle is selected such that when the device is installed on a horizontal surface water runs off the angled part. Most typically, the first and second conductive traces are spaced apart at a distance that allows formation of an electric circuit via a foot of a bird (e.g., adult pigeon or adult seagull).

Various objects, features, aspects and advantages of the present invention will become more apparent from the following detailed description of preferred embodiments of the invention.

BRIEF DESCRIPTION OF THE DRAWING

FIG. 1A is a perspective view of one exemplary device according to the inventive subject matter.

FIG. 1B is a vertical cross sectional view of the exemplary device of FIG. 1A.

DETAILED DESCRIPTION

Figure 2A:
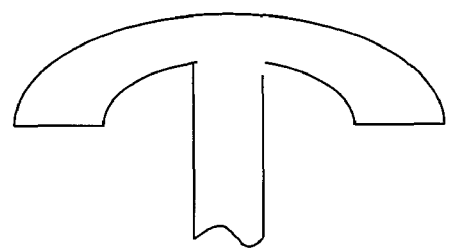
FIGS. 2A to 2D are exemplary alternative shapes for contemplated umbrelloid arc suppressors.
Figure 2B:
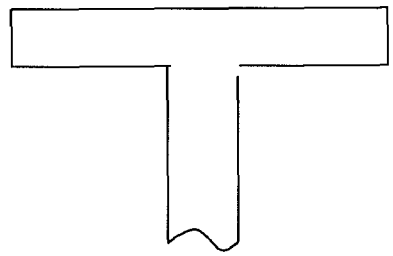
Figure 2C:
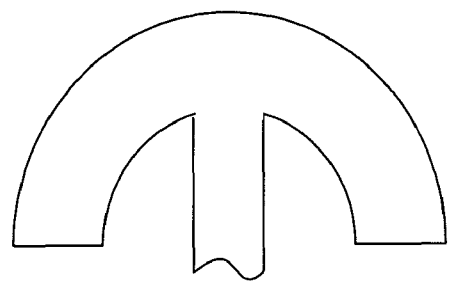
Figure 2D:
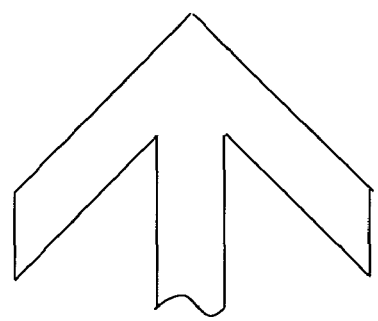

The inventor has discovered that animal deterring devices can be manufactured in which at least two electrically conductive traces are mounted on a carrier and in which the two traces are separated by an arc suppressor. Most typically, the arc suppressor in contemplated devices will have an umbrelloid shape and/or a configuration effective to increase creep distance between the first and second conductive traces by at least 1.5 times.

One exemplary embodiment is depicted in FIG. 1A in which the device 100A has a rail shape. Here, carrier 102A is typically manufactured from a thermoplastic elastomer or rubber-containing compound to which the conductive traces 120A and 122A are coupled (e.g., glued, stapled, sewn, etc.). The traces 120A and 122A are separated by the arc suppressor 110A that has an umbrelloid shape (here: T-shape). The traces may be coupled to the carrier on a horizontal or angled (104A) surface as shown in FIG. 1A. The carrier may further include one or more cutouts 106A (shown in dashed lines), which are most preferably configured such that the device can be bent sideways while resting on a horizontal surface without warping of the carrier. It should be noted that the shape of the arc suppressor will generate a space 112A that is protected from contact with conductive material falling vertically (and even from falling at an angle of up to 45 degrees, and more) onto the device. Still further, it should be noted that the shape of the arc suppressor will also provide for a vertical clearance (i.e., empty space between the shortest vertical distance between at least one of the conductive traces and the top surface of the device or the arc suppressor) that is effective in disrupting a conductive film, flow, and/or layer between the traces.

Typically, the carrier 102B will have a strip or otherwise elongated configuration, and is most preferably relatively flat such that the device can be bent, or even provided in a rolled-up configuration. FIG. 1B depicts a vertical cross section of the device in which the carrier 102B has an angled section 104B and a horizontal section onto which the conductive traces 120B and 122B are mounted. Between the traces is the arc suppressor 110B. It should be recognized that contemplated devices may not only have an arc suppressor that separates the first and second conductive traces, but may also have an (second) arc suppressor that separates at least one of the conductive traces from the material upon which the device is mounted (e.g., metal roof). With respect to the shape of contemplated second arc suppressors it should be recognized that the second suppressor will have a downward facing surface that forms in combination with another surface an edge or other protruding shape from which water, condensation, or other liquid will run off. A metal wire of other deformable material may be included to maintain a particular shape where the carrier is intentionally deformed.

It should still be especially appreciated that the shape of the arc suppressor will elongate the creep distance between the conductive traces at least 1.5 times, thereby preventing all or almost all circumstances where moisture, dew, or rain may cause short-circuiting. As used herein, the term "creep distance" refers to a distance that is measured between two points on a body when following the shortest path between those points along the surface of that body. As also used herein, the term "umbrelloid shape" refers to any shape of an element that is coupled to the device where that element has a downward facing surface portion when the device is installed on a horizontal surface. Most typically, the downward facing portion is contiguous with an upward facing portion, and the element will therefore have a sharp angled or rounded edge from which water or other fluids can drip off. Viewed from a different perspective, elements with umbrelloid shape will generally have a downward facing portion and an upward facing portion that are either substantially parallel (+/−15 degrees), or form an angle between 15 and less than 90 degrees. Exemplary umbrelloid shapes are depicted in FIGS. 2A to 2D. Suitable umbrelloid shapes therefore especially include a T-shape, a stemmed inverted U-shape, and a stemmed inverted V-shape.

With respect to the carrier, it is contemplated that the carrier may be fabricated from numerous materials, including natural and synthetic materials, wood, glass, metals and metal alloys, and all reasonable combination thereof. However, especially preferred materials include those that provide sufficient flexibility to the carrier to allow the carrier to conform to uneven surfaces. Most preferably, the carrier is soft enough to be manually deformed. It is also noted that where the carrier is especially pliable, a desired form may be retained by inclusion of a more resilient element within or coupled to the carrier. For example, contemplated carriers may include a metal wire or other deformable element that assists the carrier to maintain a desired configuration. Furthermore, it is generally preferred that the carrier material is non-conductive and that the conductive traces are coupled to the carrier in a relatively simple manner (e.g., via gluing, sewing, stapling, etc.). However, in alternative aspects, the carrier may also be made from, or include a conductive material. In such devices, it is then contemplated that only one conductive trace may be needed, and that such trace is typically coupled to the carrier via an insulator.

It is still further preferred that the carrier is generally flat (i.e., has a width and length that is larger than the height) and configured as a stripe or has an otherwise elongated structure, wherein the particular width and height are in most circumstances determined by the size of bird or other animal that is to be deterred. Thus, and most commonly, the carrier will be configured such that entire device has a height to width ratio between 1:5 and 1:2, and more typically between 1:4 and 1:3. For example, suitable carriers may have a width between 1 cm and 10 cm, more typically between 2 cm and 7 cm, and most typically between 3 cm and 5 cm. The length of such devices is generally determined by the desired overall length of the device or device segment and may therefore vary between several cm and several meters and even longer. The height of contemplated devices will generally be between 1 mm and 3 cm, and more typically between 3 mm and 1 cm. Further contemplated carriers may include one or more cutouts having a size that allows side-to-side flexing of the carrier. For example, such cutouts may be formed to allow positioning the carrier in a 90 degree angle with a radius of less than 20 cm, more preferably less than 15 cm, and most preferably less than 10 cm.

First and second conductive traces are typically spaced apart at a distance that allows formation of an electric circuit when a foot of a bird (e.g., an adult pigeon, an adult seagull) rests on the device. Therefore, and depending on the particular bird, suitable distances between first and second traces will be between 5 mm and 2 cm, and more typically between 7 mm and 1.5 cm. In still further preferred aspects, the first and second conductive traces are parallel to the arc suppressor, and/or at least one of the first and second conductive traces are continuous along substantially (+/−5%) the entire length of the carrier. Where desirable, at one part of the carrier is angled to a degree such that when the device is installed on a horizontal surface water runs off the angled part. Depending on the particular configuration, the angled part may include the portion to which the trace is coupled, and/or a portion between conductive trace and the arc suppressor or the outer edge of the carrier.

With respect to the arc suppressor, it is generally preferred that the arc suppressor has an umbrelloid shape and is continuous along the length of the carrier. While there are numerous alternative configurations are contemplated for the arc suppressor, it is generally preferred that the arc suppressor increases the creep distance at least 1.5 times, more typically at least 1.7 times, even more typically at least 2.0 times, and most typically at least 2.2 time. In especially preferred aspects, the arc suppressor has an umbrelloid shape and a height to width ratio between 1: and 1:1, and more typically between 1:6 and 1:1. For example, contemplated arc suppressors generally include stemmed structures in which a first generally vertical element carries a horizontal or curved element to form a T-shape, a stemmed inverted V-shape, a stemmed inverted U-shape, or an otherwise stemmed structure that has at least one generally horizontally extending protrusion. Depending on the particular shape, it should be appreciated that a vertical gap will be formed between at least part of the arc suppressor and the portion of the carrier to which the traces are coupled, and that such gap will assist in breaking a layer of conductive material that extends across the device.

Further alternative arc suppressors will resemble in shape insulator chains as known from high voltage power lines. While not limiting to the inventive subject matter, it is generally preferred that the arc suppressor is continuous along substantially the entire length (+/−5%) of the carrier. To further facilitate run-off of moisture, condensation, mist, or other fluids, it is generally preferred that at least part of the arc suppressor may be angled, wherein the angle is selected such that when the device is installed on a horizontal surface water runs off the angled part. Therefore, particularly preferred devices will have a stripe-shaped carrier having a first conductive trace that is separated from a second conductive trace by an umbrelloid arc suppressor, wherein the device has a height to width ratio between 1:5 and 1:2.

Figures 3A, 3B:
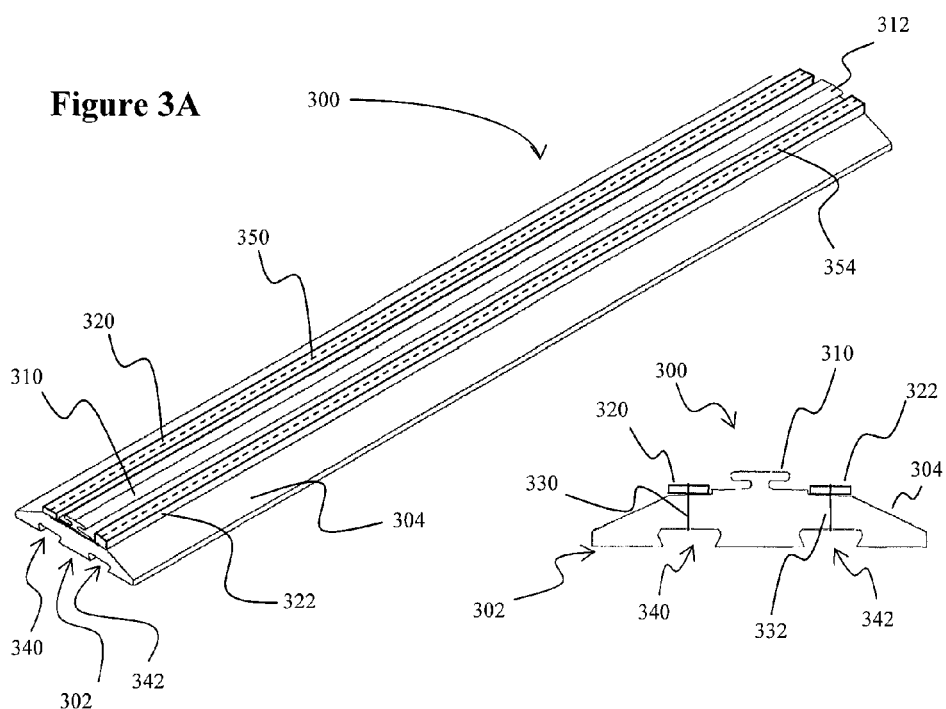
FIGS. 3A-3B are perspective and vertical cross-sectional views, respectively, of another embodiment of a bird deterrent device.
Figure 3C:
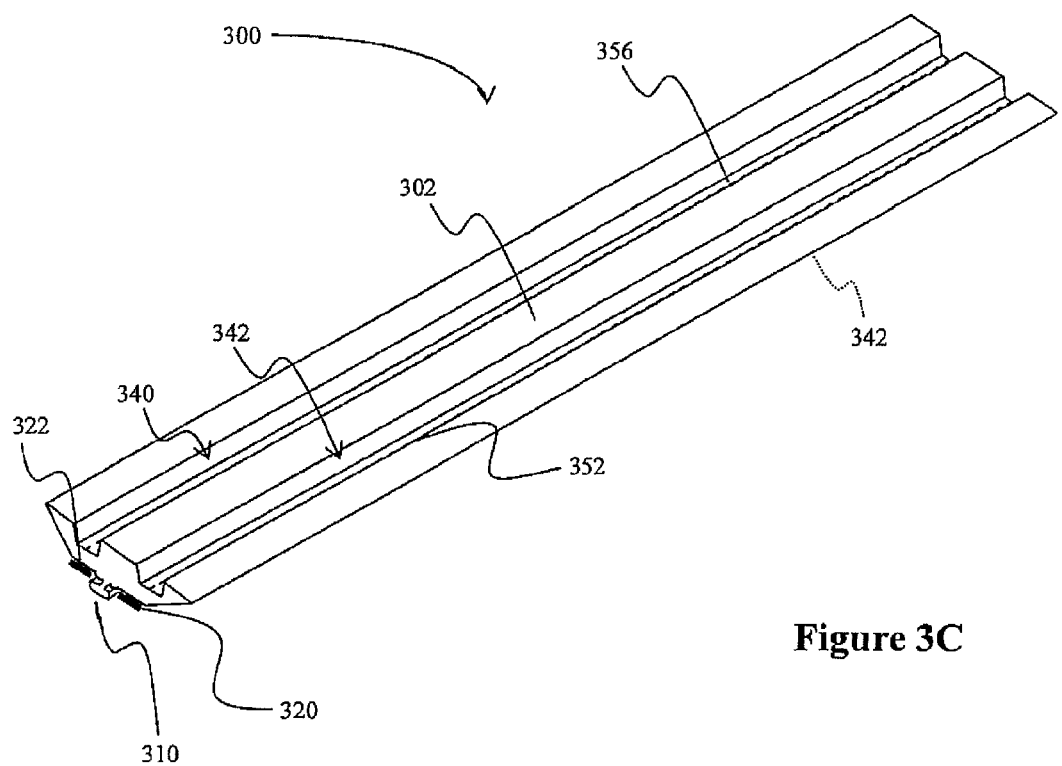
FIG. 3C is a perspective view of the bird deterrent device of FIG. 3A.

Another embodiment of a bird deterrent device 300 is shown in FIGS. 3A-3C, in which the device 300 has an elongated carrier 302, to which conductive traces 320 and 322 can be coupled using any commercially suitable fastener(s) including, for example, glues and other adhesives, and metal and plastic staples, thread, and other mechanical fasteners, and any combination(s) thereof. Carrier 302 can be manufactured from a thermoplastic elastomer or rubber-containing compound, or other commercially suitable materials or combinations thereof. In preferred embodiments, the carrier 302 is relatively flat such that the device 300 can be bent, or even provided in a rolled-up configuration.

Traces 330 and 332 are preferably knitted, such as those described in U.S. patent publ. no. 2010/0180490 to Donoho, although braided traces are also contemplated.

In preferred embodiments, each of the conductive traces 320 and 322 are coupled to carrier 302 by threads 330 and 332, respectively. The traces 320 and 322 may be coupled to the carrier 302 on a horizontal surface or an angled surface 304, and are preferably disposed over glue troughs 340 and 342, respectively. In especially preferred embodiments, the first trace 320 is coupled to the carrier 302 by a thread 330 that extends from the first trace 320 to the first glue trough 340 to form first and second seams 350 and 352, respectively, and the second trace 322 is coupled to the carrier 302 by a thread 332 that extends from the second trace 322 to the second glue trough 342 to form third and fourth seams 354 and 356, respectively. Sewing traces 320 and 322 to the carrier 302 advantageously allows the traces 320 and 322 to flex as the carrier 302 flexes.

Furthermore, sewing the traces 320 and 322 to glue troughs 340 and 342 rather than the bottom of carrier 302 advantageously raises the seams 350 and 352 from the bottom of carrier 302, which ensures that that an accumulation of water beneath the carrier 302 will not short the traces 320 and 322 due to absorption of water by thread 330 and/or 332. Moreover, glue can be disposed in glue troughs 340 and 342 to attach the carrier 302 to a surface, which can create a barrier between any accumulated water and seams 354 and 356 to further prevent water from being absorbed by, and seeping up, threads 330 and 332. In this manner, shorting of one or both of traces 320 and 322 can be prevented because water is prevented from seeping up threads 330 and 332. If the threads 330 and 332 were otherwise extended to a bottom of carrier 302, rain or other sources of water could be absorbed by, and seep up, thread 330 or 332, which could cause trace 320 or 322 to short.

In some contemplated embodiments, the traces 320 and 322 can be coupled to the carrier 302 using plastic thread, metal staples, or plastic staples, for example, which would also prevent water from seeping up the fasteners.

In other contemplated embodiments, the traces 320 and 322 can be separated by an arc suppressor 310 having an T-shape, although other umbrelloid shapes or other commercially suitable shapes could be used that are sufficient to prevent the traces 320 and 322 from arching. It should be noted that the shape of the arc suppressor 310 can advantageously generate a space 112A that is protected from contact with conductive material falling vertically (and even from falling at an angle of up to 45 degrees, and more) onto the device 300. Still further, it should be noted that the shape of the arc suppressor 310 will also provide for a vertical clearance (i.e., empty space between the shortest vertical distance between at least one of the conductive traces 320, 322 and the top surface of the device 300 or the arc suppressor 310) that is effective in disrupting a conductive film, flow, and/or layer between the traces 320 and 322.

Thus, specific embodiments and applications of electrified animal repellent tracks have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein, is inconsistent or contrary to the definition of that term provided herein, the definition of that term provided herein applies and the definition of that term in the reference does not apply.

What is claimed is:

1. An animal deterrent device, comprising:
a flexible, elongated carrier having first and second conductive traces and a bottom with a first trough at least partially disposed beneath the first conductive trace and a second trough at least partially disposed beneath the second conductive trace; and
wherein the first conductive trace is coupled to the carrier by a first fastener that extends from the first trough to the first conductive trace.

2. The device of claim 1, wherein the first conductive trace comprises a braided wire.

3. The device of claim 1, wherein the first conductive trace is sewn to the carrier.

4. The device of claim 3, wherein the first conductive trace comprises a first seam, and the first trough comprises a second seam.

5. The device of claim 1, wherein the first conductive trace comprises a braided wire, and the first conductive trace is sewn to the carrier.

6. The device of claim 1, wherein the first conductive trace comprises a knitted wire.

7. The device of claim 1, wherein the second conductive trace is separated from the first conductive trace by an elevated arc suppressor.

8. The device of claim 1, wherein each of the first and second conductive traces comprises a braided wire.

9. The device of claim 1, wherein each of the first and second conductive traces comprises a knitted wire.

10. The device of claim 1, wherein the second conductive trace is sewn to the carrier.

11. The device of claim 10, wherein the second conductive trace comprises a first seam, and the second trough comprises a second seam.

12. The device of claim 1, wherein the carrier has an elevated arc suppressor disposed between the first and second conductive traces.

13. The device of claim 12, wherein the elevated arc suppressor has a shape selected from a group consisting of an umbrelloid shape, a T-shape, a stemmed inverted U-shape, and a stemmed inverted V-shape.

14. The device of claim 1, wherein the first trough comprises a raised portion on the bottom of the carrier.

* * * * *